United States Patent
Danner et al.

(10) Patent No.: US 9,897,179 B2
(45) Date of Patent: Feb. 20, 2018

(54) BEARING FOR SUPPORTING A LINEARLY RECIPROCATING STRUCTURE

(71) Applicants: Jason Lee Danner, Lantana, TX (US); Paul Blake Svejkovsky, Coppell, TX (US)

(72) Inventors: Jason Lee Danner, Lantana, TX (US); Paul Blake Svejkovsky, Coppell, TX (US)

(73) Assignee: Karen Sue Svejkovsky, Rockwall, TX (US), Trustee of the Paul A. Svejkovsky Family Trust ( * ) Notice: Subject to any disclaimer, the term of this patent is extended or adjusted under 35 U.S.C. 154(b) by 0 days.

(21) Appl. No.: 15/204,792

(22) Filed: Jul. 7, 2016

(65) Prior Publication Data

US 2018/0010672 A1   Jan. 11, 2018

(51) Int. Cl.
*B65G 25/04*   (2006.01)
*F16H 19/02*   (2006.01)
*B65G 27/10*   (2006.01)

(52) U.S. Cl.
CPC .............. *F16H 19/02* (2013.01); *B65G 27/10* (2013.01)

(58) Field of Classification Search
CPC ........................................................ F16H 19/02
USPC .................... 198/750.1, 750.8; 74/27, 52
See application file for complete search history.

(56) References Cited

U.S. PATENT DOCUMENTS

| 2,445,613 | A | * | 7/1948 | Fincher | B07B 1/42 74/26 |
| 2,991,872 | A | * | 7/1961 | Keegan | B06B 1/10 198/766 |
| 4,339,029 | A | * | 7/1982 | Wilson | B65G 27/12 198/750.8 |
| 5,794,757 | A |  | 8/1998 | Svejkovsky et al. | |
| 5,850,906 | A | * | 12/1998 | Dean | B65G 27/32 198/750.1 |
| 6,415,911 | B1 | * | 7/2002 | Svejkovksy | B65G 27/12 198/750.1 |
| 6,435,337 | B1 | * | 8/2002 | Sahlberg | B65G 25/04 198/766 |
| 6,598,733 | B2 | * | 7/2003 | Kato | B65G 27/02 198/621.3 |
| 6,858,005 | B2 |  | 2/2005 | Ohline et al. | |
| 7,387,198 | B2 | * | 6/2008 | Thomson | B65G 27/20 198/760 |
| 7,416,658 | B2 | * | 8/2008 | Hur | B01D 21/245 198/750.8 |

(Continued)

*Primary Examiner* — Douglas A Hess
(74) *Attorney, Agent, or Firm* — Patrick K. Steele (57) ABSTRACT

An apparatus that functions as a linear bearing for supporting a reciprocating structure that reciprocates along a linear path includes a first body including a pinion gear with a first diameter and a first number of teeth for engagement with a second number of teeth that is twice the first number and on an interior ring gear of a second body. The interior ring gear is disposed within an interior cavity. The first body also includes a support member connected to the pinion gear with a crank, the support member being aligned with a point at the periphery of the pinion gear so that it will, upon rotation of the pinion gear while engaged with the ring gear, cyclically reciprocate along a linear path. The apparatus can be used to support reciprocating structures such as, for example, a reciprocating conveyor.

18 Claims, 7 Drawing Sheets

(56) References Cited

U.S. PATENT DOCUMENTS

| | | | | |
|---|---|---|---|---|
| 7,581,459 B2* | 9/2009 | Gourjon | ................ | B65G 25/04 |
| | | | | 198/750.8 |
| 7,650,986 B2* | 1/2010 | Kwasniewicz | ........ | B65G 27/12 |
| | | | | 198/750.8 |
| 8,066,114 B2* | 11/2011 | Svejkovsky | ........... | B65G 27/20 |
| | | | | 198/758 |
| 8,151,975 B1* | 4/2012 | Anderson | ............ | B65G 25/065 |
| | | | | 198/750.1 |
| 8,584,833 B2* | 11/2013 | Sandberg | ............... | B65G 27/12 |
| | | | | 198/750.1 |
| 8,721,253 B1* | 5/2014 | Ebeling | ................. | B65G 25/04 |
| | | | | 414/749.1 |
| 9,126,765 B2* | 9/2015 | Groenewald | .......... | B65G 27/12 |

\* cited by examiner

BEARING FOR SUPPORTING A LINEARLY RECIPROCATING STRUCTURE

BACKGROUND

Field of the Invention

The present invention relates to a linear support bearing. More specifically, the present invention relates to a bearing that is adapted for supporting an object for reciprocal movement of the object relative to a supporting structure.

Many industrial and manufacturing processes include the use of structures that reciprocate. For example, but not by way of limitation, some types of conveyors move boxes, packages and goods along a smooth conveyor surface by moving the conveyor surface in a first direction at a first rate of acceleration, and then by reversing and moving the conveyor surface back to the original position at a second rate of acceleration that is greater than the first rate of acceleration. This cycle of motion is called differential impulse motion, and a conveyor using this motion would be a differential impulse conveyor. This motion causes the boxes, packages or other articles supported on the conveyor surface to move with the conveyor surface in the first direction and then to slip or slide on the conveyor surface as it is returned to the original position at a second and greater rate of acceleration. By repeating this cycle, an article can be moved steadily along the conveyor surface. This particular type of reciprocating conveyor is especially useful in clean environments because the smooth conveyor surface can be of a material that can be easily cleaned and made free of contaminants and germs. It will be understood that the reciprocating conveyor is but one of the many structures that might be reciprocated in an industrial or manufacturing environment.

Some reciprocating structures are supported from a floor, wall or ceiling, or from some other structure, using supporting braces, legs, arms or struts that are pivotally coupled at a proximal end to the reciprocating structure and at a distal end to a stationary structures such as, for example, a floor, wall or ceiling. It will be understood that this type of support results in the pivotally coupled proximal end moving through an arc, and it further causes the reciprocating structure to also move along an arc defined by the length of the braces, lets, arms or struts that support the reciprocating structure. It will be understood that the longer the supporting members, and the smaller the angular range through which the supporting members swing or oscillate, the less the motion of the reciprocating structure is affected by the arc. However, this causes the reciprocating structure and the supporting members coupled thereto to take up a greater amount of space. Where space is at a premium, shorter supporting members may be required and this results in a much greater arc to be imparted to the reciprocating structure as it reciprocates.

What is needed is a linear bearing that can be used to support reciprocating structures that function best when they are moved along a straight line path.

Background of the Related Art

Differential impulse conveyors, such as that disclosed in Svejkovsky et al.'s U.S. Pat. No. 5,794,757, are one type of reciprocating structures available for moving articles along a smooth conveyor surface using differential impulse movement. An inspection of U.S. Pat. No. 5,794,757 shows the pivoting support legs (element numbers 18 and 22 in the '757 Patent) that sway or oscillate through an angle as the supported conveyor table reciprocates.

These types of reciprocating structures do not reciprocate along a straight linear path but instead move back and forth along an arc-shaped path. Depending on the arc, this may cause the conveyor surface, as well as the articles supported on the conveyor surface, to move through an up and down motion as the reciprocating conveyor moves back and forth.

BRIEF SUMMARY

One embodiment of the present invention provides an apparatus, comprising a pinion gear and an interior ring gear, the pinion gear having a diameter that is one-half the diameter of the interior ring gear in which the pinion gear revolves and rotates. The ring gear includes a plurality of teeth that are adapted for engagement with a plurality of teeth on the interior ring gear. The pinion gear rotates twice for each revolution of the pinion gear around an axis of the interior ring gear. For this geometric combination, there is a point on the pinion gear that is in engagement with the interior ring gear at all times, and there is a point on the pinion gear that is in alignment with the axis of the interior ring gear at all times because the radius of the interior ring gear is equal to the diameter of the pinion gear.

This mathematical and geometric phenomenon is called the Tusi Couple, named for the $13^{th}$ century Persian astronomer Nasir al-Din al-Tusi. Tusi found that a smaller circle rotating and revolving within a larger circle of twice the diameter will, at any selected point at the periphery of the smaller circle, trace and then retrace a diameter across the larger circle, also known as oscillatory motion. Using gears with teeth along their periphery enables us to prevent slippage and to maintain positive contact between the two circles and to thereby produce the oscillatory motion.

Many machines include components that reciprocate back and forth in a constant direction. For example, but not by way of limitation, some conveyors include flat horizontal surfaces for supporting articles that will move in a desired direction due to the surface being accelerated at a first rate in a first direction, decelerated and then stopped, accelerated in a second, opposite direction at a second rate of acceleration that is greater than the first, decelerated and then stopped, and the cycle repeats itself. These types of reciprocating conveyors move articles along the surface of the conveyor because the rates of acceleration in the first and then in the second direction are purposefully selected to cause no slipping, or very limited slipping, of the articles on the surface of the conveyor as the conveyor is accelerated at the first rate in the first direction, and then to cause slippage, or to cause a greater amount of slippage, of the articles as the conveyor is accelerated at the second, greater rate in the second, opposite direction. It will be understood that this repeated cycle will cause the articles to move in the first direction along the conveyor. This principle is explained in more detail and enabled in U.S. Pat. No. 5,794,757 to Paul A. Svejkovsky.

Reciprocating conveyors conventionally use devices that convert constant rotational speed motor output to a cyclically variable rotational speed output. It will be understood that the conversion of constant rotational speed from an electrical motor, for example, can be obtained by the use of eccentrically mounted sheaves and/or pulleys and the like. Alternately, electronically controlled electric motors can now provide cyclically variable rotational output. Either a constant speed rotational output with a device to convert the constant rotational speed to a cyclically variable rotational output or an electronically controlled electric motor with directly variable speed output can be used to power reciprocation of a conveyor.

DETAILED DESCRIPTION

Figure 1:
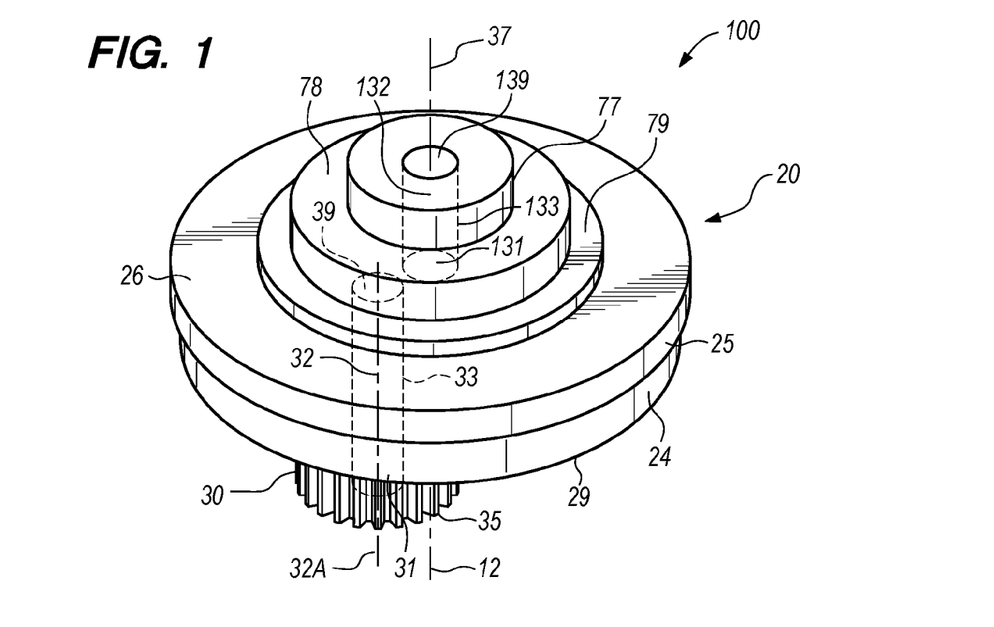
FIG. 1 is a perspective view of a first body of an embodiment of the apparatus of the present invention.

FIG. 1 is a superior perspective view of a first body 20 of an embodiment of the apparatus 100 of the present invention. The first body 20 includes a closure member 26, a pinion gear 30 coupled below the closure member 26 to a proximal end 31 of a pinion shaft 33 (shown in dotted lines) having an axis 32. The pinion gear 30 has an axis 32A that is coincident same as the axis 32 of the pinion shaft 33. The pinion shaft 33 includes a distal end 39 connected above the closure member 26 to an arm member 79 and a proximal end 31 connected to the pinion gear 30. The pinion shaft 33 is rotatably received through an aperture (not shown in FIG. 1) in the closure member 26.

Figure 2:
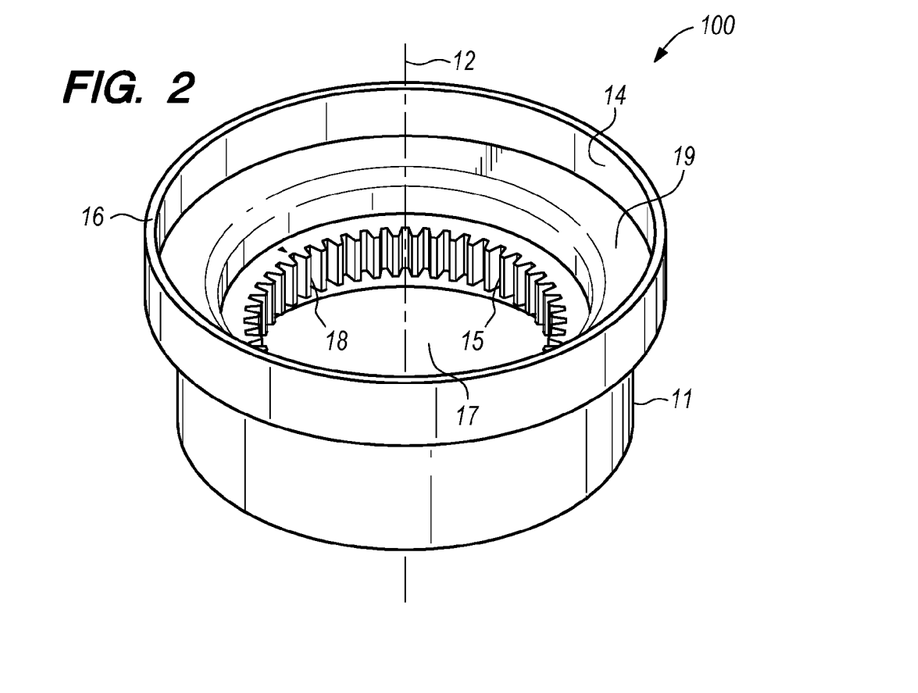
FIG. 2 is a perspective view of a second body of the embodiment of the apparatus of the present invention that includes the first body of FIG. 1.

The closure member 26 of the first body 20 is shaped to engage and close an interior cavity 17 of a second body 11 (see second body 11 shown in FIG. 2). FIG. 1 shows that the closure member 26 may include a proximal portion 24 and an adjacent distal portion 25. The first body 20 of FIG. 1 further includes a support member 132 connected to the arm member 79. The support member 132 is connected to the arm member 79 at a position that is offset from an axis 32 of the pinion shaft 33. The support member 132 extends generally parallel to the axis 32 of the pinion shaft 33. The pinion gear 30, the pinion shaft 32, the arm member 79 and the support member 132 together form a crank. The support member 132 is surrounded by a distal load plate 77 and a proximal load plate 78 to together provide a larger load bearing surface.

FIG. 2 is a superior perspective view of a second body 11 of the embodiment of the apparatus 100 of the present invention that includes the first body 20 illustrated in FIG. 1. The second body 11 is shown in an aligned position with the first body 20 of FIG. 1 with the proximal portion 24 of the closure member 26 of the first body 20 of FIG. 1 in alignment with an interior cavity 17 of the second body 11 of FIG. 2. The interior cavity 17 of the second body 11 in FIG. 2 includes an interior ring gear 10 with a second plurality of ring gear teeth 15 adapted for engaging the first plurality of pinion gear teeth 35 of the pinion gear 30 of the first body 20 shown in FIG. 1. The distal portion 25 of the closure member 26 of the second body 20 of FIG. 1 is sized and configured for engaging the top 16 of a rim 14 of the second body 11 of FIG. 2. The proximal portion 24 of the closure member 26 of the first body 20 of FIG. 1 is sized for landing on and being supported by the landing 19A surrounding the interior cavity 17 of the second body 11 of FIG. 2.

Figure 3:
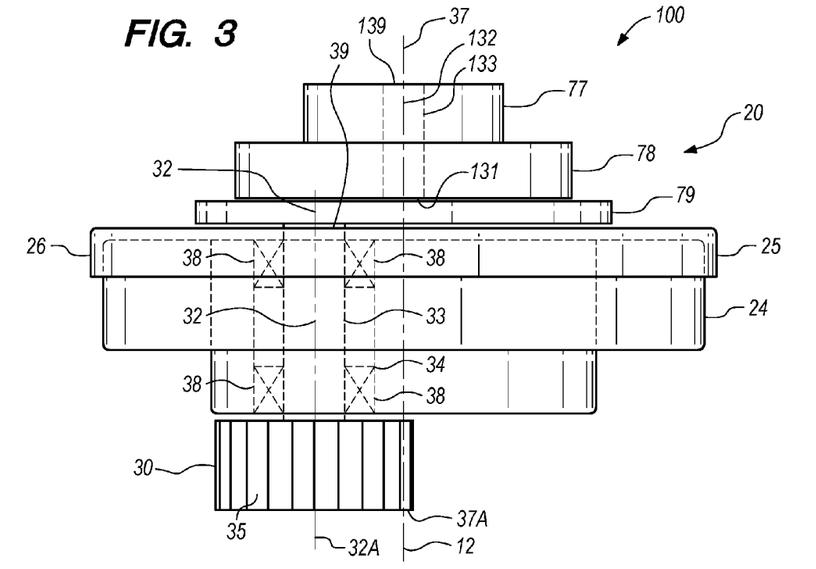
FIG. 3 is a partially sectioned view of the first body of FIG. 1.

FIG. 3 is a partially sectioned elevation view of the first body 20 of FIG. 1. FIG. 3 better illustrates the axis 37 of the support member 132 being offset from and parallel to the axis 32 of the pinion shaft 33 and the axis 32A of the pinion gear 30 coincident therewith. The combination of the support member 132, the arm member 79, the pinion shaft 33 and the pinion gear 30 form a crank member because the motion of the support member 132 is a function of both the rotation and position of the pinion gear 30 and the offset between the axis 37 of the support member 132 and the axis 32 of the pinion shaft 33. FIG. 3 further reveals the position of optional bearings 38 provided in the closure member 26 to rotatably secure the pinion shaft 33 relative to the closure member 26. The pinion shaft 33 is rotatably received through an aperture 34 in the distal portion 25 and the proximal portion 24 of the closure member 26. Bearings 38 may be provided to minimize friction resulting from rotation of the pinion shaft 33.

Figure 4:
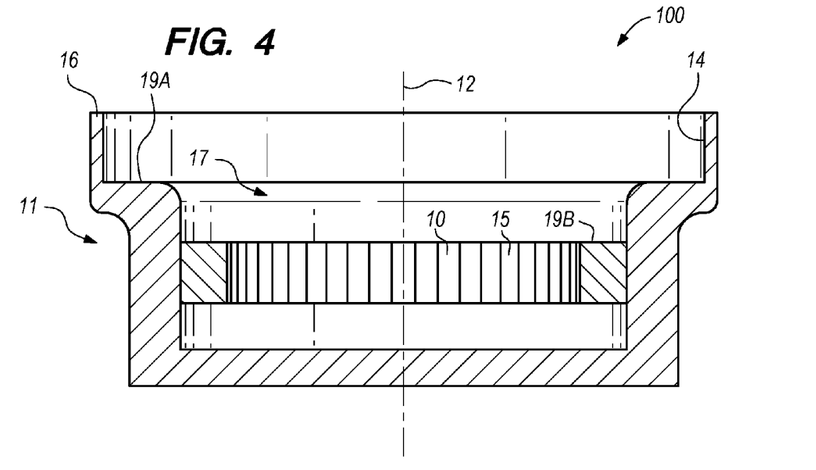
FIG. 4 is a sectional view of the second body of FIG. 2 illustrating the position of the landing and the rim near a top of the second body and the interior ring gear within the interior cavity of the ring gear.

FIG. 4 is a sectional view of the second body 11 of FIG. 2 illustrating the position of the landing 19A and the rim 14 near a top 16 of the second body 11 and the interior ring gear 10 within the interior cavity 17 of the second body 11. FIG. 4 illustrates the sizing of the rim 14 to receive the proximal portion 24 of the closure member 20 of FIG. 3 and to engage the distal portion 25 of the closure member 26 of FIG. 3. The rim 14 is sized to receive and surround the proximal portion 24 of the closure member 26, and the landing 19B of the second body 11 is at a depth relative to the top 16 of the second body 11 to engage and support the proximal portion 24 of the closure member 26.

Figure 5:
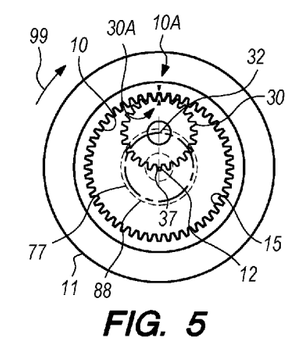
FIG. 5 is a diagram illustrating the position of the pinion gear of the first body of FIGS. 1 and 3 disposed in engagement with the interior ring gear of the second body of FIGS. 2 and 4, the teeth of the pinion gear of the first body engaging the teeth of the ring gear of the second body.

FIG. 5 is a diagram illustrating the position of the pinion gear 30 of the first body 20 of FIGS. 1 and 3 disposed in engagement with the interior ring gear 10 of the second body 11 of FIGS. 2 and 4, the teeth 15 of the pinion gear 30 of the first body 20 engaging the teeth 35 of the ring gear 10 of the second body 11. FIG. 5 illustrates the position of a point 37A on the pinion gear 30 that is disposed in alignment with the axis 37 of a support member 133 (not shown in FIG. 5) that is connected to the pinion gear 30. The support member 133 is discussed further below. The axis 32 of the pinion gear 30 will move in a circular path 88 and in the direction of the arrow 99 in FIG. 5. The pinion gear 30 will rotate about its axis 32 as the axis 32 follows the circular path 88. The uniformly dashed circle (indicated by the reference numeral 77) indicates the position of the distal load plate 77 corresponding to the position of the pinion gear 30 within the interior ring gear 10. The distal load plate 77, which will be centered around the support member 133 (not shown in FIG. 5—see FIG. 3) which is, in turn, always in alignment with the same point 32A at the periphery of the pinion gear 30.

Figure 6:
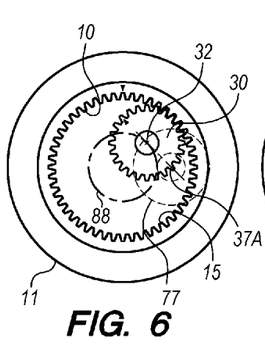
FIG. 6 is the diagram of FIG. 5 after the pinion gear rotates about its axis while the axis of the pinion gear simultaneously translates, in a clockwise direction, along a circular path around an axis of the interior ring gear.

FIG. 6 is the diagram of FIG. 5 after the pinion gear 30 rotates about its axis 32 while the axis 32 of the pinion gear 30 simultaneously translates, in a clockwise direction, along a circular path 88 around an axis 12 of the interior ring gear 10. The uniformly dashed circle (indicated by the reference numeral 77) indicates the position of the distal load plate 77 corresponding to the position of the pinion gear 30 within the interior ring gear 10.

Figure 7:
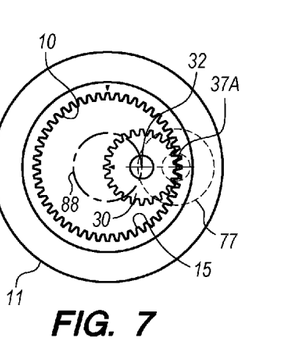
FIG. 7 is the diagram of FIG. 6 after the pinion gear rotates further about its axis while the axis of the pinion gear continues to translate, in a clockwise direction, along a circular path around an axis of the interior ring gear.

FIG. 7 is the diagram of FIG. 6 after the pinion gear 30 rotates further about its axis 32 while the axis 32 of the pinion gear 30 continues to translate, in a clockwise direction, along a circular path 88 around an axis 12 of the interior ring gear 10. The uniformly dashed circle (indicated by the reference numeral 77) indicates the position of the distal load plate 77 corresponding to the position of the pinion gear 30 within the interior ring gear 10.

Figure 8:
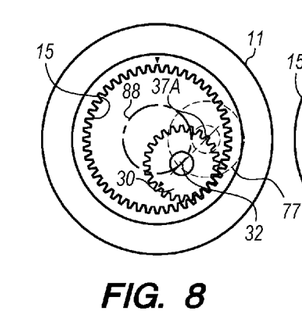
FIG. 8 is the diagram of FIG. 7 after the pinion gear rotates about its axis while the axis of the pinion gear simultaneously translates, in a clockwise direction, along a circular path around an axis of the interior ring gear.

FIG. 8 is the diagram of FIG. 7 after the pinion gear 30 rotates about its axis 32 while the axis 32 of the pinion gear 30 simultaneously translates, in a clockwise direction, along a circular path 88 around an axis 12 of the interior ring gear 10. The uniformly dashed circle (indicated by the reference numeral 77) indicates the position of the distal load plate 77 corresponding to the position of the pinion gear 30 within the interior ring gear 10.

Figure 9:
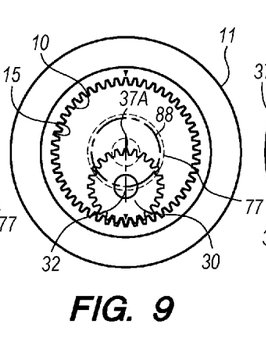
FIG. 9 is the diagram of FIG. 8 after the pinion gear rotates about its axis while the axis of the pinion gear simultaneously translates, in a clockwise direction, along a circular path around an axis of the interior ring gear.

FIG. 9 is the diagram of FIG. 8 after the pinion gear 30 rotates about its axis 32 while the axis 32 of the pinion gear 30 simultaneously translates, in a clockwise direction, along a circular path 88 around an axis 12 of the interior ring gear 10. The uniformly dashed circle (indicated by the reference numeral 77) indicates the position of the distal load plate 77 corresponding to the position of the pinion gear 30 within the interior ring gear 10.

Figure 10:
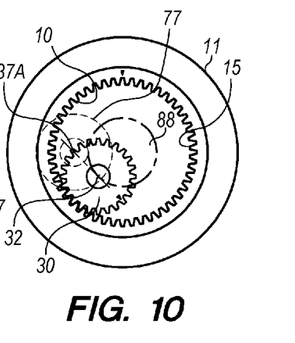
FIG. 10 is the diagram of FIG. 9 after the pinion gear rotates about its axis while the axis of the pinion gear simultaneously translates, in a clockwise direction, along a circular path around an axis of the interior ring gear.

FIG. 10 is the diagram of FIG. 9 after the pinion gear 30 rotates about its axis 32 while the axis 32 of the pinion gear 30 simultaneously translates, in a clockwise direction, along a circular path 88 around an axis 12 of the interior ring gear 10. The uniformly dashed circle (indicated by the reference numeral 77) indicates the position of the distal load plate 77 corresponding to the position of the pinion gear 30 within the interior ring gear 10.

Figure 11:
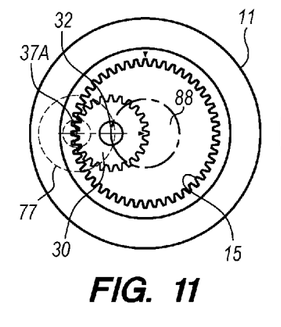
FIG. 11 is the diagram of FIG. 10 after the pinion gear rotates about its axis while the axis of the pinion gear simultaneously translates, in a clockwise direction, along a circular path around an axis of the interior ring gear.

FIG. 11 is the diagram of FIG. 10 after the pinion gear 30 rotates about its axis 32 while the axis 32 of the pinion gear 30 simultaneously translates, in a clockwise direction, along a circular path 88 around an axis 12 of the interior ring gear 10. The uniformly dashed circle (indicated by the reference numeral 77) indicates the position of the distal load plate 77 corresponding to the position of the pinion gear 30 within the interior ring gear 10.

Figure 12:
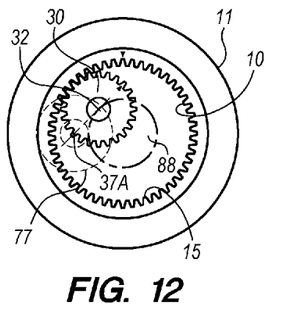
FIG. 12 is the diagram of FIG. 11 after the pinion gear rotates about its axis while the axis of the pinion gear simultaneously translates, in a clockwise direction, along a circular path around an axis of the interior ring gear.

FIG. 12 is the diagram of FIG. 11 after the pinion gear 30 rotates about its axis 32 while the axis 32 of the pinion gear 30 simultaneously translates, in a clockwise direction, along a circular path 88 around an axis 12 of the interior ring gear 10. The uniformly dashed circle (indicated by the reference numeral 77) indicates the position of the distal load plate 77 corresponding to the position of the pinion gear 30 within the interior ring gear 10.

Figure 13:
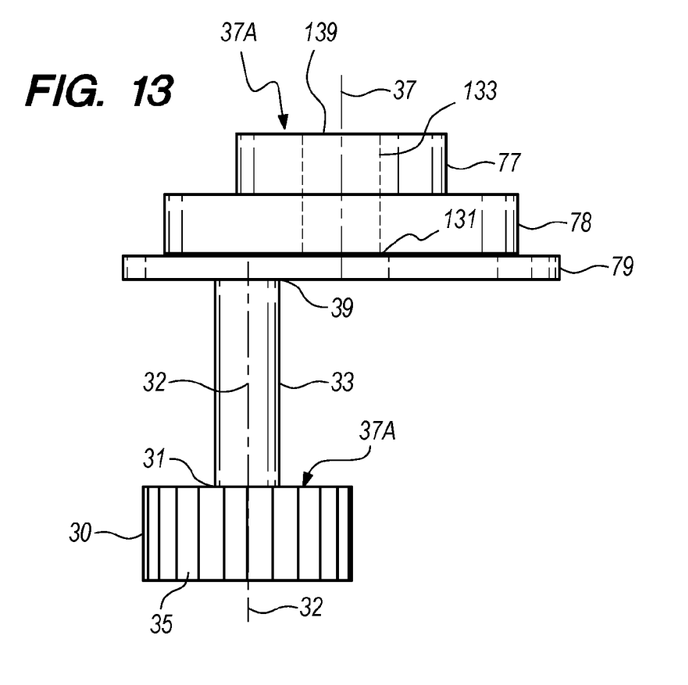
FIG. 13 is an elevation view of the pinion gear of the first body rotatably disposed on a proximal end of a pinion shaft 33 having a distal end connected to an arm.

FIG. 13 is an elevation view of the pinion gear 30 of the first body 20 rotatably disposed on a proximal end 31 of a pinion shaft 33 having a distal end 39 connected to an arm 79. The axis 37 of the distal load plate 77, which is centered around the load support 133 (not shown in FIG. 13—see FIG. 3) is fixed in alignment with the point 37A. The arm member 79 is connected to the distal end 39 of the pinion shaft 33 and also to the proximal end 131 of the load support 133 that is surrounded at its distal end 139 by the distal load plate 77 and surrounded intermediate the proximal end 131 and the distal end 139 by the proximal load plate 78. The arm member 79 may be shaped to provide a large sliding engagement contact area between the arm member 79 and the closure member 26 (not shown in FIG. 13—see FIG. 3) and also to provide a large sliding engagement contact area between the arm member 79 and the proximal load plate 78.

Figure 13A:
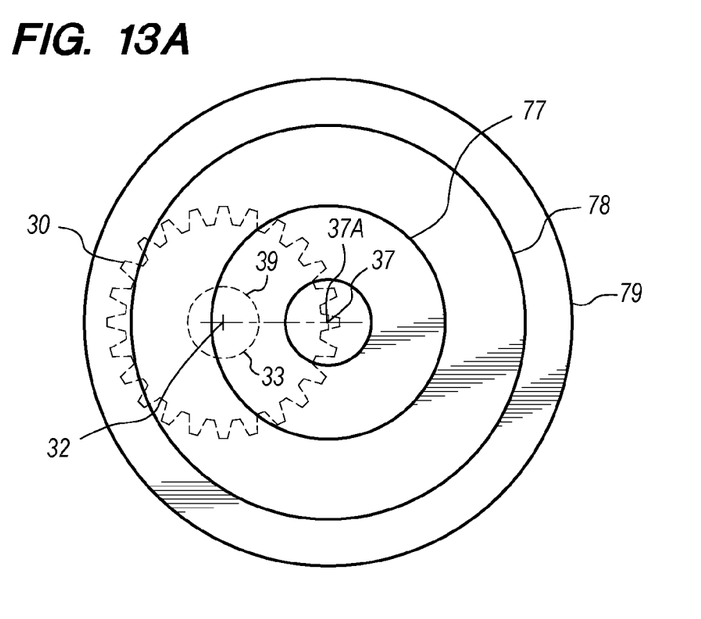
FIG. 13A is a diagram illustrating the position of the pinion gear, the distal end of the pinion shaft, the axis of the pinion shaft, and the support member and the axis of the support member during the cyclic operation of the apparatus.

FIG. 13A is a diagram illustrating the position of the pinion gear 30, the distal end 39 of the pinion shaft 33, the axis 32 of the pinion shaft 33, and the support member 133 and the axis 37 of the support member 133 during the cyclic operation of the apparatus 100. The positions of these components of the apparatus 100 in FIG. 13A corresponds to the position shown in FIG. 11.

Figure 14:
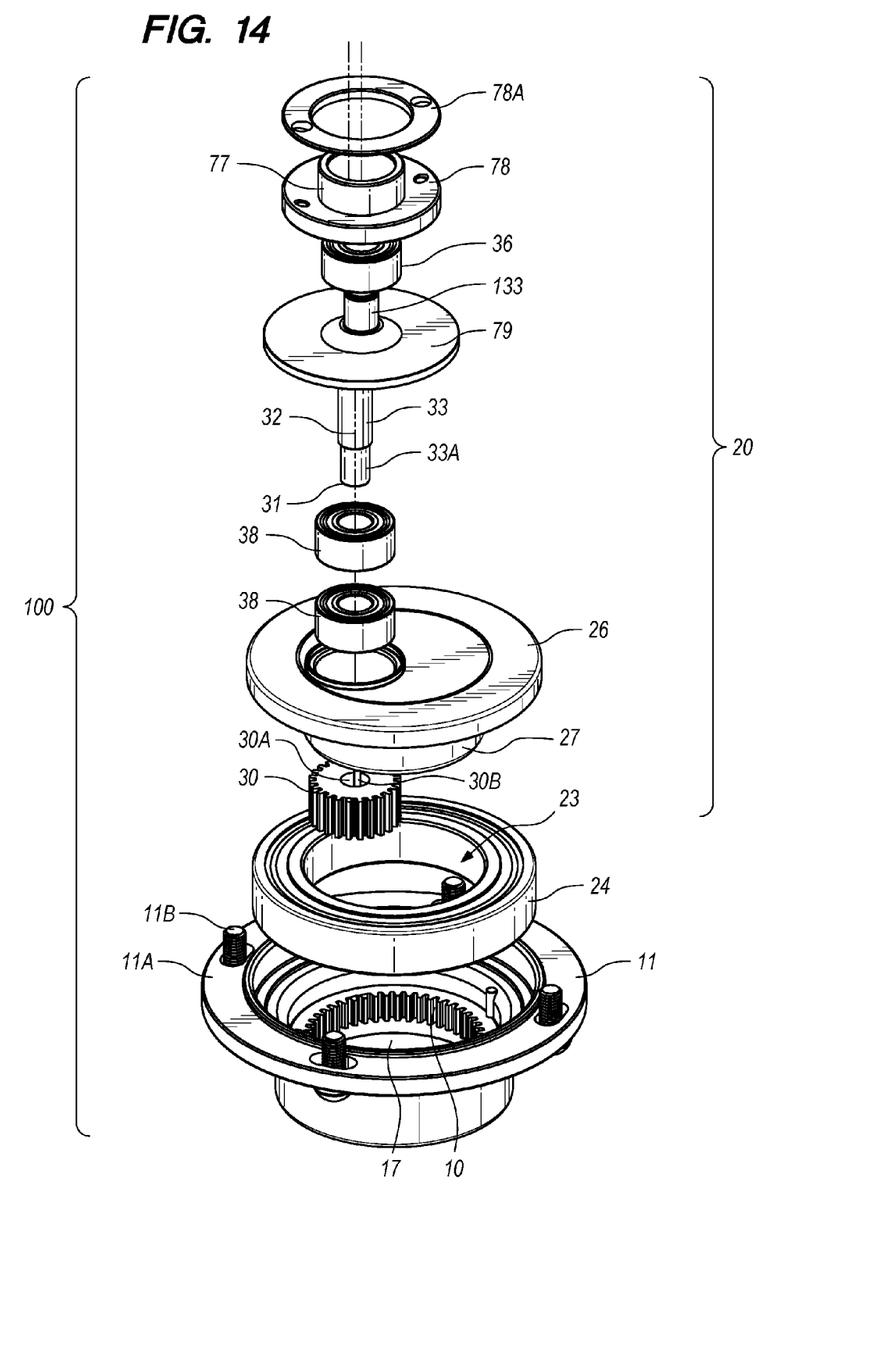
FIG. 14 is a superior exploded view of an embodiment of the apparatus of the present invention.

FIG. 14 is a superior exploded view of an embodiment of the apparatus 100 of the present invention. FIG. 14 illustrates a number of components that can be assembled to provide the apparatus 100. The embodiment of the apparatus 100 in FIG. 14 includes a first body 20 that includes a closure member 26 having an aperture 34 through which the pinion shaft 33 will extend upon assembly. The pinion shaft 33 is aligned with a pair of bearings 38 that will stabilize the pinion shaft 33 and reduce frictional engagement between the pinion shaft 30 and the closure member 26. FIG. 14 illustrates the arm member 79 connected to a distal end 39 (not shown in FIG. 14) of the pinion shaft 33. The support member 133 extends upwardly from the arm member 79. The support member 133 is generally parallel with but offset from the pinion shaft 33, and is connected to the arm member 79. The support member 79 may be fitted with a bearing 36 to reduce friction, a distal load plate 77 with a flange 78 and a ring cap 78A to provide a larger load bearing area for the support member 79.

The pinion gear 30 illustrated in FIG. 14 includes a bore 30A having a keyway 30B for securing the pinion gear 30 to rotate with the pinion shaft 33. The pinion shaft 33 includes a reduced diameter portion 33A that is received and secured within the bore 30A of the pinion gear 30.

FIG. 14 further illustrates the proximal portion 24 of the closure member 26 being a bearing. The proximal portion 24 is sized to receive a protruding portion 27 on the closure member 29 within a bore 23 of the proximal portion 24 upon assembly of the apparatus 100. The pinion gear 30 will engage the interior ring gear 10 of the second body 11 below the proximal portion 24 upon assembly of the apparatus 100.

FIG. 14 further illustrates the use of fasteners 11B in a flange 11A around the second body 11 for use in securing the assembled apparatus 100 to a supporting structure to enable the apparatus 100 to be used as a linear bearing for supporting a reciprocating structure.

Figure 15:
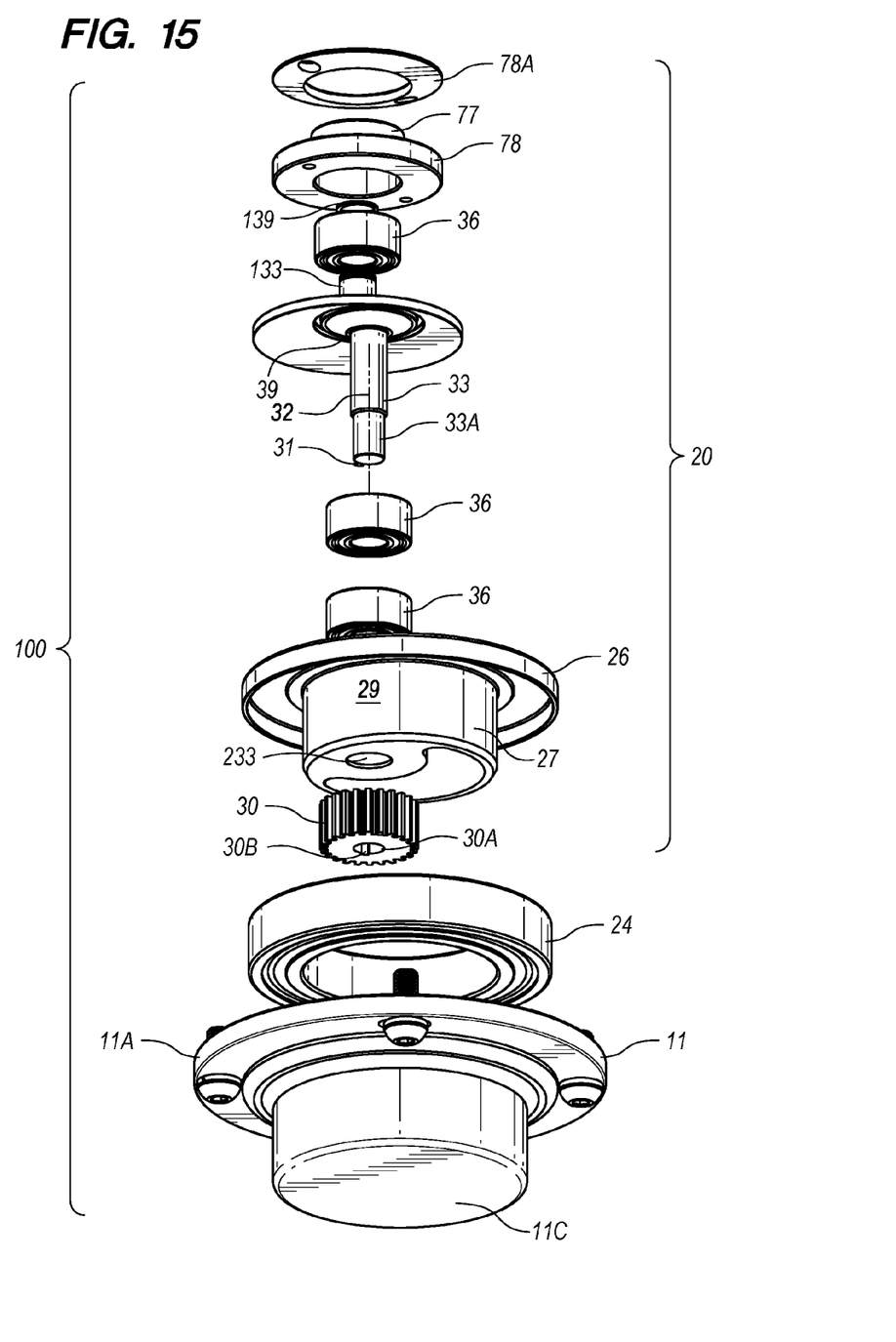
FIG. 15 is an inferior exploded view of the apparatus of FIG. 14.

FIG. 15 is an inferior exploded view of the apparatus 100 of FIG. 14. FIG. 15 reveals the distal end 39 of the pinion shaft 30 connected to the arm member 79 at a position that is offset from the adjacent support member 133 extending from the arm member 79. FIG. 15 also reveals the protruding portion 27 on the closure member 26 that is sized for being received into the bore 23 of the proximal portion 24 (bearing) of the closure member 26. The protruding portion 27 of the closure member 26 includes a circular exterior surface 29 that engages the proximal portion 24 of the closure member 26 (bearing) to rotatably secure the closure member 26 and the protruding portion 27 in position within the apparatus 100. The protruding portion 27 further includes an aperture 233 for receiving the pinion shaft 33 through the closure member 26. It will be understood that the combination of the exterior surface 29 of the protruding portion 27 of the closure member 26, the proximal portion 24 (bearing) having a bore 23 to receive and engage the protruding portion 27, and the aperture 233 through the protruding portion 27 to rotatably receive the pinion shaft 33 work together to restrain the movement of the pinion shaft 33 to rotation within the aperture 233, as permitted by the engagement of the pinion gear 30 with the interior ring gear 10, and also to maintain the axis 32A (not shown in FIG. 15) of the rotating pinion gear 30 and the axis 32 pinion shaft 33 remain on a path defined by the circle 88 shown in FIGS. 5-12. It will be further understood that the offset between the axis 32 of the pinion shaft 33 and the support member 133 is of an amount that causes the support member 133 to be aligned with, and to remain in alignment with, a point 37A at the periphery of the pinion gear 30 (see FIGS. 5-12). In this manner, the support member 133 will move in unison with the aligned point 37A on the periphery of the pinion gear 30 as it supports a reciprocating structure such as, for example, a reciprocating conveyor.

FIG. 15 illustrates how the second body 11 may include a bottom 11C so that lubrication disposed within the second body 11 to lubricate the pinion gear 30, the interior ring gear 10, and the pinion shaft 33 will remain isolated within the assembled apparatus 100 and free from external debris.

Figure 16:
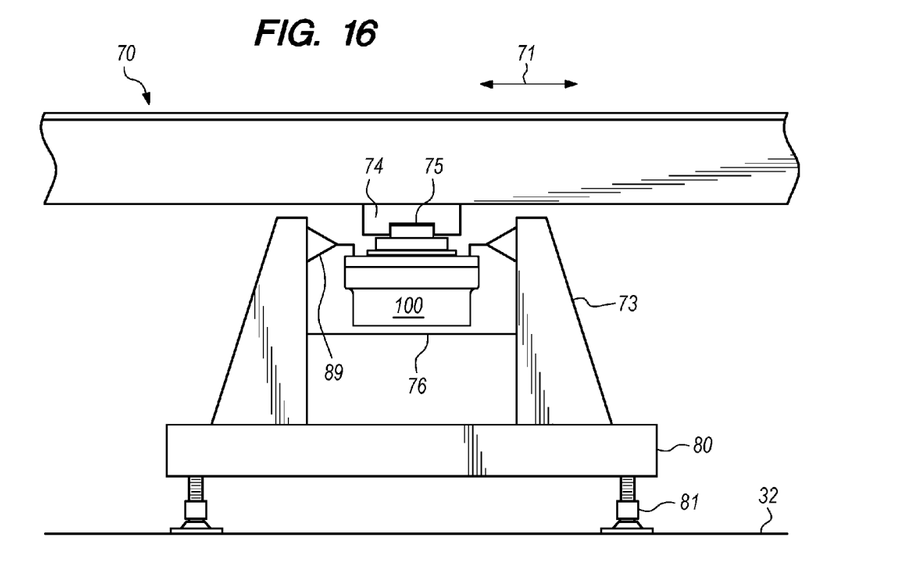
FIG. 16 is an elevation view of a section of a reciprocating conveyor reciprocating as indicated by arrows while being supported on an embodiment of the apparatus.

FIG. 16 is an elevation view of a section of a reciprocating conveyor 70 reciprocating as indicated by arrows 71 while being supported on an embodiment of the apparatus 100. The apparatus 100, when applied in the manner shown in FIG. 16, functions as a linear bearing that provides support to the conveyor 70 as it cyclically reciprocates. The apparatus 100 in FIG. 16 is supported on a support frame 73 having a generally horizontal support surface 76 that is substantially parallel to the reciprocation movement of the conveyor 70 and on a pair of brackets 89 that are engaged by the fasteners 11B (not shown in FIG. 16—see FIG. 14) on the second body 11 of the apparatus 100. The conveyor 70 includes a conveyor bracket 74 having a recess 75 therein to receive the support member 133 and/or the distal load plate 77 of the apparatus 100. The frame 73 may include adjustable support feet 81 for supporting the support frame 73 on a floor 82, and the support feet 81 may be optimally adjusted to provide proper support to the conveyor bracket 74 for smooth reciprocation of the conveyor 70. It will be understood that the stroke of reciprocation of the conveyor 70, which is the distance of movement of the conveyor 70 in each direction for each cycle of reciprocation, will be equal to the stroke of the apparatus 100 which is the distance that the distal load plate 77 will move from the position shown in FIG. 7 to the position shown in FIG. 11.

Figure 17:
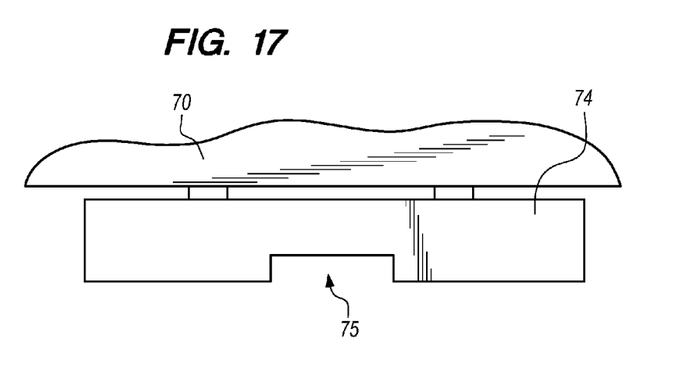
FIG. 17 is an enlarged view of the bracket of FIG. 16 illustrating the recess as being shaped and sized to engage the distal end of the support member and/or the distal load plate of the apparatus.

FIG. 17 is an enlarged view of the bracket 74 of FIG. 16 illustrating the recess 75 as being shaped and sized to engage the distal end 139 of the support member 133 and/or the distal load plate 77 of the apparatus 100 (not shown in FIG. 17—see FIG. 16).

Returning to FIG. 5, the orientation of the pinion gear 30 and the support member 133 connected thereto of the first body 20 relative to the interior ring gear 10 of the second body 11 will determine the orientation of the line on which linear reciprocation of the support member 133 will occur. The apparatus 100 of the present invention can be indexed upon assembly to enable the first body 20 and the second body 11 to be oriented to provide linear reciprocation of the support member 133 along a desired linear pathway. For example, but not by way of limitation, the interior ring gear 10 may include a ring gear mark 10A as shown in FIG. 5. Similarly, the pinion gear 30 may include a pinion gear mark 30A as shown in FIG. 5 immediately radially inwardly towards the axis 12 of the interior ring gear 10 of the second body 11. The alignment of the ring gear mark 10A and the pinion gear mark 30A as shown in FIG. 5 would, in the example shown in FIGS. 5-12, result in the support member 133 (not shown in FIG. 5) reciprocating horizontally across the interior ring gear 10 as illustrated in FIGS. 5-12. It will be understood that the orientation of the second body 11 and the pinion gear within the interior ring gear 10 of the second body 11 is needed to provide for proper movement of the support member 133 with the reciprocation of the structure supported on the apparatus 100, such as the conveyor 70 of FIG. 16.

It will be understood that embodiments of the present invention are limited only by the claims that are appended hereto below. The embodiments illustrated in the appended drawings include a distal load plate 77 that may be received into a recess 75 in a conveyor bracket 74. However, the support member 133 on the arm member 79 in FIG. 13 can be coupled to the reciprocating structure 70 (conveyor) that is supported by the support member 133 in other ways without departing from the use of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus, comprising:
   a first body having a closure member with an aperture therethrough, a pinion gear having a first diameter and a first plurality of teeth, a pinion shaft penetrating the aperture of the closure member and connected at a proximal end to the pinion gear on a first side of the closure member, an arm member connected to a distal end of the pinion shaft on a second side of the closure member opposite the first side, a support member connected to the arm member and extending substantially parallel to the pinion shaft but offset from being in alignment with the pinion shaft, the offset being sufficient to align an axis of the support member with a point on a periphery of the pinion gear;
   a second body having an interior cavity with an interior ring gear of a second diameter that is twice the first diameter, the interior ring gear having a second plurality of teeth about a periphery of the interior ring gear, the second plurality of teeth being adapted to engage the first plurality of teeth on the pinion gear and the second plurality being twice the first plurality, the interior cavity of the second body having an opening;
   a protruding portion of the closure member surrounding the aperture through which the pinion shaft passes, the protruding portion having a radially exterior wall; and
   a bearing having a bore to receive and surround the protruding portion of the closure member upon engagement of the closure member with the opening to the interior cavity of the second body to close the interior cavity and to position the first plurality of teeth of the pinion shaft in engagement with the second plurality of teeth of the interior ring gear;
   wherein the support member that is aligned with the point on the periphery of the pinion gear reciprocates along a straight path as the axis of the pinion gear revolves about a center axis of the second body as the pinion gear rotates about the axis of the pinion shaft while remaining in engagement with the interior ring gear.

2. The apparatus of claim 1, wherein the interior cavity of the second body includes an opening that is closed by the closure member.

3. The apparatus of claim 1, further comprising:
   a bearing disposed intermediate the pinion shaft and the aperture of the closure member to stabilize the pinion shaft and to reduce rotational friction between the pinion shaft and the closure member.

4. The apparatus of claim 3, further comprising:
   an amount of lubricant disposed within the interior cavity of the second body;
   wherein the first body seals with the second body to contain the amount of lubricant.

5. The apparatus of claim 1, wherein the second body further comprises:
   a bottom disposed proximal the interior ring gear to contain lubricant.

6. The apparatus of claim 1, wherein the second body further comprises:
   a landing disposed around the interior ring gear to engage and support a portion of the first body to support a reciprocating structure supported by the apparatus.

7. The apparatus of claim 1, further comprising a distal load plate coupled to the support member of the first body to engage a corresponding structure on a reciprocating structure supported by the apparatus.

8. The apparatus of claim 1, further comprising:
   a first mark on the interior ring gear; and
   a second mark on the pinion gear;
   wherein the apparatus can be assembled by aligning the first mark with the second mark upon installing the first body with the pinion shaft and the pinion gear onto the second body with the interior ring gear.

9. An apparatus for supporting a reciprocating structure, comprising:
   a first body having a closure member, an aperture through the closure member, a pinion shaft penetrating the aperture with a pinion gear having a first diameter connected to a proximal end of the pinion shaft, a distal end of the pinion shaft further including an offset load supporting portion aligned with a point on a periphery of the pinion gear;
   a second body having an interior ring gear having a second diameter twice the first diameter, and a landing surrounding an opening to the interior ring gear to engage and support the closure member;
   wherein as the pinion gear of the first body rotates and revolves within the interior ring gear of the second body, the load supporting portion of the pinion shaft reciprocates along a linear path; and
   wherein a reciprocating structure can be supported by the apparatus through the load supporting portion of the pinion shaft.

10. The apparatus of claim 9,
    wherein at least a portion of a load on the apparatus from the reciprocating structure is supported by the landing through the closure member.

11. The apparatus of claim 10, wherein the second body further comprises a bottom disposed opposite the interior ring gear from the landing;
    wherein the bottom contains lubricant that may be supplied to lubricate the mating pinion gear and interior ring gear.

12. The apparatus of claim 9, further comprising:
    a bearing disposed intermediate the pinion shaft and the aperture of the first body to stabilize the pinion shaft and to reduce rotational friction between the pinion shaft and the first body.

13. The apparatus of claim 9, further comprising:
    a first mark on the interior ring gear; and
    a second mark on the pinion gear;
    wherein the apparatus can be assembled by aligning the first mark with the second mark upon installing the first body with the pinion shaft and the pinion gear onto the second body with the interior ring gear.

14. A method, comprising:
providing a first body having a closure member, an aperture through the closure member, a pinion shaft having a proximal end and a distal end, a pinion gear having a first plurality of teeth connected to the proximal end of the pinion shaft and a load supporting portion on the distal end of the pinion shaft;
providing a second body having an interior ring gear with a second plurality of teeth that is twice the first plurality of teeth on the pinion gear, the second body further including a landing surrounding an opening to the interior ring gear to engage and support the first body;
aligning the closure member with the landing and disposing the first body onto the second body to engage the first plurality of teeth on the pinion gear of the first body with the second plurality of teeth of the interior ring gear of the second body;
supporting the second body with the first body engaged thereon;
supporting a reciprocatable structure with the load supporting portion on the distal end of the pinion shaft; and
reciprocating the structure along a linear path as the pinion gear revolves and rotates within the interior ring gear.

15. The method of claim 14, further comprising:
providing a floor opposite the interior ring gear from the opening of the second body to contain a lubricant within the second body to lubricate the pinion gear and the interior ring gear.

16. The method of claim 14, further comprising:
disposing a first mark on the interior ring gear;
disposing a second mark on the pinion gear; and
aligning the first mark with the second mark upon installing the first body onto the second body.

17. The method of claim 14, further comprising:
providing a seal between the closure member of the first body and the second body.

18. The method of claim 14, further comprising:
providing a reciprocating driver motor;
coupling the reciprocating driver motor to the reciprocating structure; and
activating the reciprocating driver motor to reciprocate the structure as it is supported on the load bearing portion of the second body.

\* \* \* \* \*